Aug. 11, 1931.   W. NELSON   1,818,572
WHEEL AND RIM STRUCTURE
Filed May 11, 1928
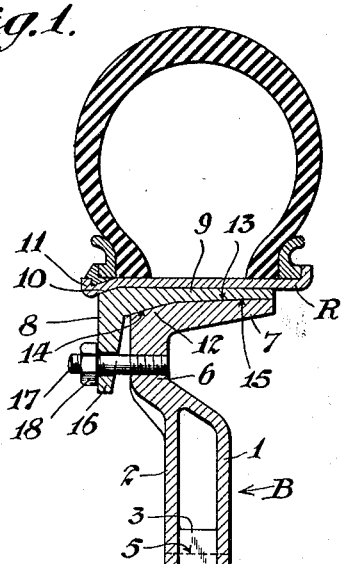
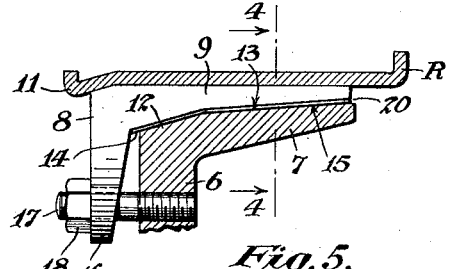
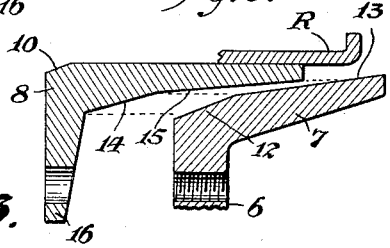
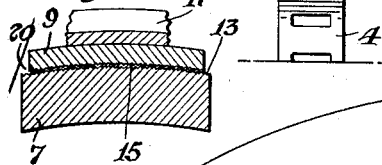
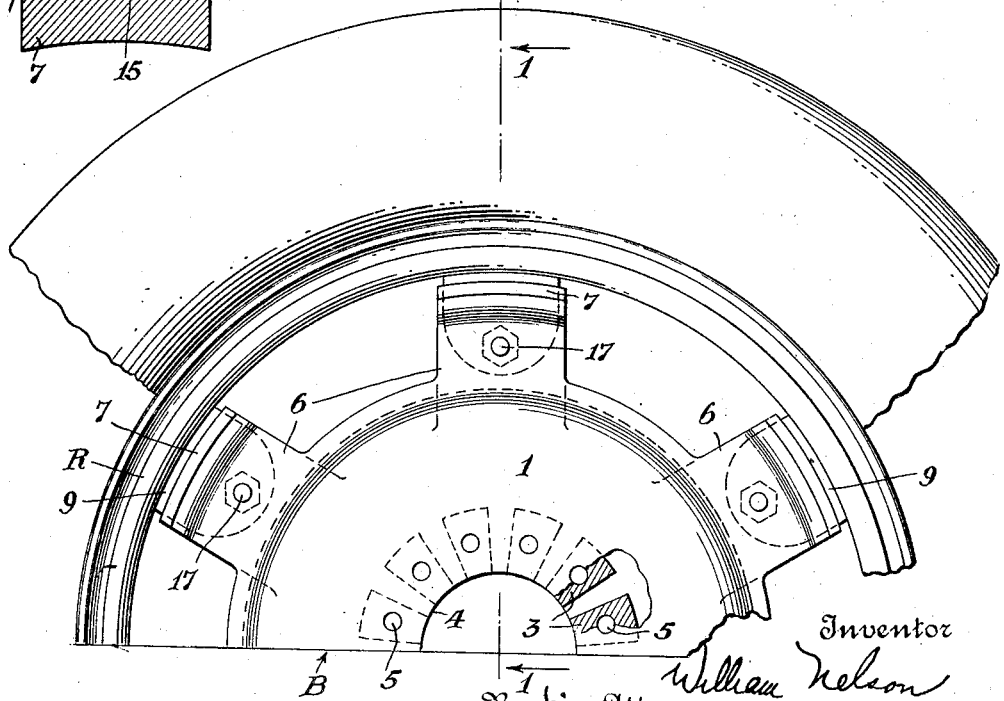
Inventor
William Nelson
By his Attorney Patented Aug. 11, 1931

1,818,572

UNITED STATES PATENT OFFICE

WILLIAM NELSON, OF MINNEAPOLIS, MINNESOTA

WHEEL AND RIM STRUCTURE

Application filed May 11, 1928. Serial No. 276,869.

My invention relates to wheel and rim structures, and more especially to metal wheels and demountable-tire-rims to cooperate therewith.

An important object is to provide a metal wheel body which is adapted for application to known or standard types of motor vehicle hubs in place of the wood spoke structure or wheel body for which such hubs are primarily designed. Other objects are to provide supporting clamps which support and tension the tire rim in a novel and advantageous way and to adapt the outer part of the wheel body to cooperate with such supporting clamps.

The characteristics and advantages of the invention are further sufficiently explained in connection with the following detail detail description of the accompanying drawings, which show one representative embodiment. After considering this example, skilled persons will understand that many variations may be made without departing from the principles disclosed, and I contemplate the employment of any structures that are properly within the scope of the appended claims.

In the drawings:

Fig. 1 is a section at 1—1 of Fig. 3, of one-half of a wheel and rim structure embodying the invention in one form.

Fig. 2 is a detail view on enlarged scale.

Fig. 3 is a side elevation of one-half of the wheel and rim structure.

Fig. 4 is a sectional detail at 4—4, Fig. 2.

Fig. 5 is an explanatory detail view.

The wheel body B is of cast metal, usually steel, and its inward portion is hollow or of annular box form, including an inner wall 1 and an outer wall 2 spaced therefrom, the inward margins of these walls being connected by integral spaced blocks or connectors 3. The thickness of the central body structure in the axial direction is the same as that of wood spokes of given dimensions adapted for clamping between the parts of a metal hub structure. The central aperture or bore 4 of the body is also dimensioned to fit about the tubular hub, and bolt holes 5 pass through the connectors or spacers 3 to receive the bolts commonly employed to secure the ordinary wood spoke structure to its hub. The wheel body may, therefore, be quickly applied to the hub and clamped therein by insertion of the bolts through holes 5, and when the bolts are set up the spacer blocks 3 take the clamping strain and prevent deflection of walls 1 and 2.

R is one typical or standard "demountable" tire rim sufficiently representing various rims of this class to which the wheel and clamping structure are adaptable. Such rims are usually of comparatively thin section and need additional reinforcement, and the invention provides such reinforcement and also for tensioning of the rim between its supports, whereby the rim is made more resistant to deflection.

Short spokes 6 extend from the periphery of the central structure, and these have at their ends laterally-directed flanges 7 upon which the clamps 8 are located. The outer face of each clamp is contoured to fit the inner surface of the rim. Thus in the present example the clamp includes a cylindrical outer portion 9 and a conical portion 10 to accommodate the conical inner face of the rim bead 11. The inner face of the clamp and the outer face of the supporting flange 7 have generally-complemental, segmental-conical surface. While each of these surfaces may be a simple or straight cone, it is generally preferred to make the conical formations in steps, or in two distinct portions of different pitch or taper, and also to make the cone angle of the wheel surfaces somewhat greater than that of the rim surface, to provide for proper support and tensioning of the rim. Thus each flange 7 has an outer conical portion or segment 12 of quite substantial angle relative to the wheel axis, and another conical surface 13 of moderate angle in relation to the axis, this angle also being less than that of cone surface 12. The clamp 8 has one inward conical surface 14 approximately complemental to wheel surface 12, and another conical surface 15 generally complemental to wheel surface 13, but the conical angle of either or both of the clamp surfaces is preferably less than that of the complemental wheel surface, as best understood in Fig. 5 where the clamp is in partially-assembled relation to the wheel. The cone angles as shown in Fig. 5 are considerably exaggerated, in order that the principle involved may be clearly understood.

Each clamp has an inwardly directed arm or lug 16 apertured to embrace the usual stud bolt 17 which is inserted in the spoke, and the clamp is tightened and the wheel retained by nuts 18 applied to the bolts. When the rim with its clamps is applied to the wheel the inward edges of the clamps first strike the inward portions of the spoke flanges 7, and tightening of the nuts then produces a powerful radial movement and tensioning of the rim as the surfaces 13 and 15 are brought into close contact in the clamping action. The rim is thus firmly supported and secured and placed under strong initial tension between the spoke supports enabling the rim to more effectively resist deflection under the vehicle load. The outer conical surfaces 12 and 14 are finally brought into full contact in a similar manner, the thicker portion of the clamp overlying the surface 14, however, resisting distortion more than the thinner inward portion, and enabling the clamping force to be applied more positively through the clamp to the rim.

In some cases the clamps may not be positively connected to the rim, and in such cases the rim is sufficiently retained by the powerful contact of the engaging surfaces; otherwise the clamps may be positively secured to the rim as by welding or riveting.

Desirably the contacting surfaces of the clamp and wheel flange may be roughened as at 20, that is, these surfaces may be scored or milled to provide more effective contact and positive transmission of driving and braking strains.

I claim:

1. A wheel body comprising spaced rim-supporting segments, a rim, and clamps intermediate said segments and rim, the segments and clamps having generally conical engaging surfaces, the normal cone angle of the wheel segment surfaces being greater than that of the clamp surfaces to provide powerful clamping action and tensioning of the rim.

2. A wheel body comprising spaced rim-supporting segments, a rim, and clamps intermediate said segments and rim, the clamps and wheel segments having each two adjacent complemental conical engaging surfaces of different angles in relation to the wheel axis, the cone angles of the corresponding clamp and wheel segment surfaces being different.

3. A wheel comprising a body including spaced spokes having rim supporting segments, a rim, and clamps intermediate said segments and rim, the clamps and wheel segments having each two complemental conical engaging surfaces of different angles in relation to the wheel axis, the cone angles of the corresponding clamp and wheel segment surfaces being different.

In testimony whereof I affix my signature.

WILLIAM NELSON.